United States Patent [19]

Miyoshi

[11] Patent Number: 4,828,390

[45] Date of Patent: May 9, 1989

[54] OPTICAL AXIS DISPLACEMENT SENSOR

[75] Inventor: Takashi Miyoshi, Sapporo, Japan

[73] Assignees: Okada Inc., Shizuoka; Kohgakusha Engineering Co., Ltd., Sappora, both of Japan

[21] Appl. No.: 17,594

[22] Filed: Feb. 24, 1987

[30] Foreign Application Priority Data

Feb. 25, 1986 [JP] Japan .................................. 61-38162

[51] Int. Cl.$^4$ .............................................. G01B 11/14
[52] U.S. Cl. .................................... 356/373; 356/375
[58] Field of Search ...................... 356/373, 375, 376; 250/201 AF

[56] References Cited

U.S. PATENT DOCUMENTS 4,548,504 10/1985 Morander ............................ 356/376
4,645,347 2/1987 Rioux ................................... 356/376

Primary Examiner—F. L. Evans
Attorney, Agent, or Firm—Oblon, Fisher, Spivak, McClelland & Maier

[57] ABSTRACT

A first convex lens, having a focal length f1 and a second convex lens, having a focal length f2, are arranged at an interval d (=f1+f2). A mirror is provided, on the optical axis, to reflect the laser beam from a laser thereby emitting parallel beams, through the first lens, onto the surface to be measured. The interval between the first lens and the surface is f1+z1. The interval between the second lens and the image point, at which the image of the surface is formed, is f2+z2. A position detector of this point, comprises a slit plate, a third convex lens, having a focal length f3, and a CCD line sensor. The interval between the slit plate and the sensor is $l_0$. The second and third lenses are so arranged that the focal points coincide. The slit plate is provided perpendicular to the optical axis, immediately before the third lens, and a pin hole is opened at an interval $d_0$ on either side of the optical axis. The line sensor is positioned in parallel with the slit plate. The position z2 of the image point is obtained from the interval x of the incident positions of the beams incident onto the sensor, through the two pin holes.

$$x = \{(f3^2 + f3z2 - l_0z2)d_0\}/f3(f3+z2)$$

The position z1 of the surface is obtained from the position z2 of the image point, per the formula:

$$z1 = z2/(f2/f1)^2.$$

9 Claims, 4 Drawing Sheets

F I G. 3
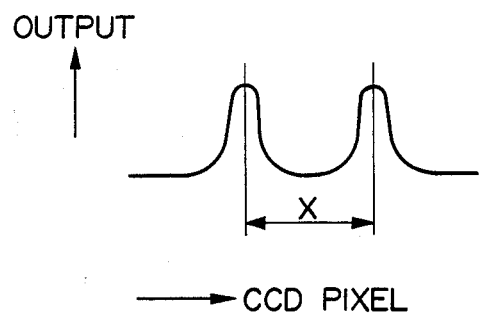
F I G. 4
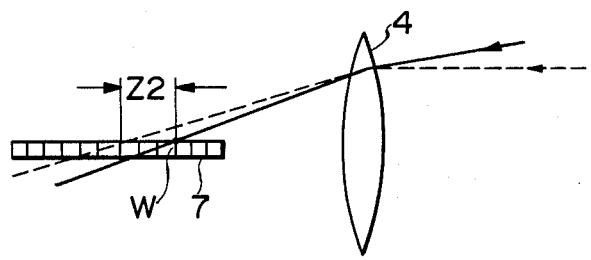
F I G. 5
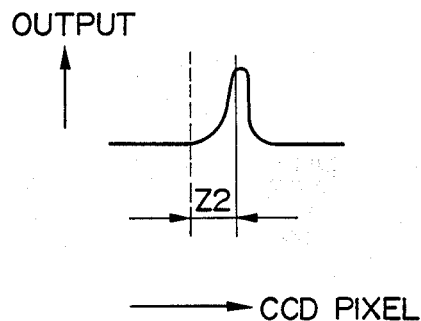

OPTICAL AXIS DISPLACEMENT SENSOR

BACKGROUND OF THE INVENTION

This invention relates an optical axis displacement sensor.

Recently, position-sensing apparatuses for measuring the displacement of a surface have been developed for loading numerical data representing a three-dimensional free-form surface having a complicated shape. These apparatuses can be classified into two types. The first type measures the distance to a surface by use of the principle of triangulation. The second type has a photoelectric converter and can be moved by a servo mechanism. The photoelectric converter detects the displacement of an image of a surface which has resulted from the displacement the surface with respect to a reference point. The apparatus is then moved by a servo mechanism until the displacement of the image is compensated, and finds the position of the surface from the distance it has been moved.

FIG. 6 shows a conventional apparatus of the first type. The apparatus has angle detector 12. Detector 12 comprises calibrating disk 11, and has a telescope, a slit plate and a photoelectric converter, all attached to disk 11. A laser beam emitted from a laser (not shown) is reflected at point P on surface S, and is incident onto angle detector 12. When surface S is shifted for distance $\Delta z$ along the laser beam emitted from the laser, the angle of reflection of the beam varies. The angular variation $\Delta\theta$ detected by detector 12 is given as:

$$\Delta\theta = \Delta z \cdot \sin \phi / R \qquad (1)$$

where $\phi$ represents the angle of an incident laser beam with respect to a line joining point P, before displacement, with the center of disk 11, and R represents the distance between point P, before displacement, and the center of disk 11.

When variation $\Delta\theta$ is obtained by detector 12, displacement $\Delta z$ of surface S can be calculated by way of the above equation (1).

FIG. 7 shows a knife-edge type positioning sensor of the second conventional apparatus. Positioning sensor 14 has micro-mirror 3 for reflecting a slightly diverged laser beam onto the optical axis of convex lens 2, knife-edge shielding plate 15 having a knife edge perpendicularly crossing the optical axis, at an image point Q of a point P, and photodetecting diodes 16a, 16b positioned symmetrically with respect to a plane defined by the optical axis and the knife edge. Sensor 14 is moved by a servo mechanism (not shown), the distance travelled being detected.

The apparatus is so adjusted that, when surface S is inclined in a plane including point P (i.e., when the image point is located at point Q), a differential output Ea-Eb of diodes 16a and 16b becomes zero. When surface S moves from the plane including point P, whereby the image point is shifted from point Q, part of the light incident on either one of diodes 16a and 16b is shielded by plate 15, so that the output Ea-Eb does not become zero. The servo mechanism moves sensor 14 such that the differential output becomes zero, and the degree of displacement from the plane including point P of surface S can be known by measuring the distance moved by sensor 14.

As can be understood from equation (1), in the apparatus of FIG. 6, $\Delta\theta$ reaches its maximum when $\phi$ is $\pi/2$, provided $\Delta z$ remains unchanged. Therefore, detector 12 should be so positioned that its detection face is perpendicular to the laser beam. In this case, however, a so-called "shadow effect" may occur wherein the light reflected from surface S is shielded by a projection protruding from detector 12 when surface S is shifted greatly as is shown in FIG. 8. Thus, a dead angle occurs, and the displacement of surface S cannot be correctly measured.

The knife-edge type sensor shown in FIG. 7 has the following drawbacks with regard to its incorporation in an optical system and the signal processing.

Plate 15 must be positioned at image point Q of point P in the optical system. To this end, the position of point Q must first be defined. As is apparent from the principle of reversibility, micro-mirror 3 must be designed and adjusted so as to reflect the beam applied from the light source and convert the beam to divergent light flux L represented by broken lines jointing point Q with some points on the surface of mirror 3. In other words, since the position of point Q (and hence point P) depends upon the optical system of the light source, the design, assembling and adjustment become complicated. Therefore, not only does the cost of the device increase, but it is also difficult to operate.

To eliminate such drawbacks, it is considered that point P depends upon the sole optical constant. For example, when parallel light beams are incident from a light source onto mirror 3, point P becomes the focal point of lens 2, and does not accordingly depend upon other optical constants. However, in this case, a new problem that image point Q (and hence the position of shielding plate 15) becomes infinitely remote.

As the rules of geometrical optics show, in the system of FIG. 7, no linearity exists between the positional changes of surface S and the that of image point Q. It is therefore difficult for a photoelectric converter to generate an output which quantitatively corresponds to the displacement of surface S. Since the light beams incident onto surface S are not parallel, the light-receiving area varies as surface S is displaced from the plane including point P, with the result that the size of the image alters, thereby giving rise to the drawback wherein the precise measurement of the displacement in a wide range is disabled.

Since the position of surface S where the differential output of diodes 16a and 16b becomes zero is located at point P, the absolute amount of light incident onto the diodes does not necessarily pose a problem with regard to signal processing. Hence, as long as the apparatus is used as a reference-pointing sensor, neither a variation in the incident energy of the diodes, generated by variations in the reflectivity of surface S and in the luminous intensity of the light source, nor an external disturbance such as an optical noise becomes a significant problem. In this sense, this apparatus is preferable, but another disadvantage of this apparatus resides in its employment of the servo mechanism. If the displacement of surface S is measured only with the apparatus in FIG. 7, without servo mechanism, the relationship between the displacement of surface S and the displacement of the image point becomes complicated. Since the measured result depends upon the difference of luminous quantities incident to diodes 16a and 16b, this apparatus has such disadvantages that the measured result cannot be obtained with reproducibility due to the difference in the reflectivity of surface S and the external disturbance.

Further, the other drawback of the apparatus in FIG. 7 is that, if surface S is not perpendicular to the optical axis, the apparatus does not correctly function. Since shielding plate 15 and diodes 16a, 16b correctly operate on the basis that the intensity distribution of lights incident from lens 2 to knife edge is symmetrical with respect to the optical axis, if surface S is inclined with respect to the optical axis, the intensity distribution of the reflected light does not become axis-symmetrical.

SUMMARY OF THE INVENTION

An object of this invention is to provide an optical axis displacement sensor of a noncontacting type capable of accurately measuring the displacement of a surface to be measured having a complicated three-dimensional free form in a wide range without shadow effect.

According to this invention, there is provided an optical axis displacement sensor comprising:

an optical system having a first convex lens including an aperture on an optical axis and a second convex lens positioned on the optical axis of the first lens, light source means for emitting parallel light beams through the aperture of the first lens onto a surface to be measured, means for detecting the position of an image point at which an image of the surface to be measured is formed by said optical system, and calculating means for calculating the position of the surface according to the output of said position detecting means.

BRIEF DESCRIPTION OF THE DRAWINGS

FIG. 3 shows a waveform of the output of a CCD line sensor of the first embodiment;

FIG. 4 is a detailed view showing an image point position detector of a second embodiment of this invention;

FIG. 5 shows a waveform diagram of the output of a CCD line sensor of the second embodiment;

DETAILED DESCRIPTION OF THE PREFERRED EMBODIMENTS

An embodiment of an optical axis displacement sensor according to this invention will be described in detail with reference to the accompanying drawings.

A principle will be first described. When first and second convex lenses having focal distances f1 and f2, respectively are arranged so as to have a distance d and the optical axes thereof are coincide with each other, an object (a surface to be measured) is positioned at a point on the optical axis separated by $f1+z1$ from the first lens, and the image of the object is formed at a point on the optical axis separated by $f2+z2$ from the second lens, the following relations can be obtained from optogeometrical imaging conditions:

$$(f1^2/z1) - (f2^2/z2) = d - (f1+f2) \qquad (2)$$

where $$-f1 < z1 < f1^2/f2 \qquad (3)$$

The relationship between z1 and z2 of equation (2) is complicated, but if the following equation (4) is assumed, $$d = f1 + f2 \qquad (4)$$

the equation (2) can be simply expressed as below.

$$z2 = (f2/f1)^2 z1 \qquad (5)$$

The above equation (5) exhibits that the optical system which employs this lens system ($d = f1 + f2$) has the following features:

1. There is a simple proportional relation between position z1 of the surface to be measured and position z2 of the image point. Therefore, when position z2 of the image point is measured, position z1 of the surface to be measured can be obtained.

2. The proportional relationship between z1 and z2 can be arbitrarily varied by the ratio of f1 of f2. Therefore, the wide range of displacement of z1 from micrometers to a few hundred millimeters can be measured with the constant displacement of z2.

3. When position z1 of the surface to be measured is zero, position z2 of the image point also becomes zero. More specifically, when the surface to be measured is positioned at a focal point F1 of the first lens, the image point becomes focal point F2 of the second lens. Therefore, when focal point F1 is used as a reference (fixed point) of the position of the surface to be measured, focal point F2 becomes a reference position of the image point. Thus, the reference position depends only upon a sole optical constant (which is focal point F1 of the first lens in this case) irrespective of the arrangement of the component of the apparatus. Therefore, the construction and the adjustment of the apparatus can be simplified.

Figure 1:
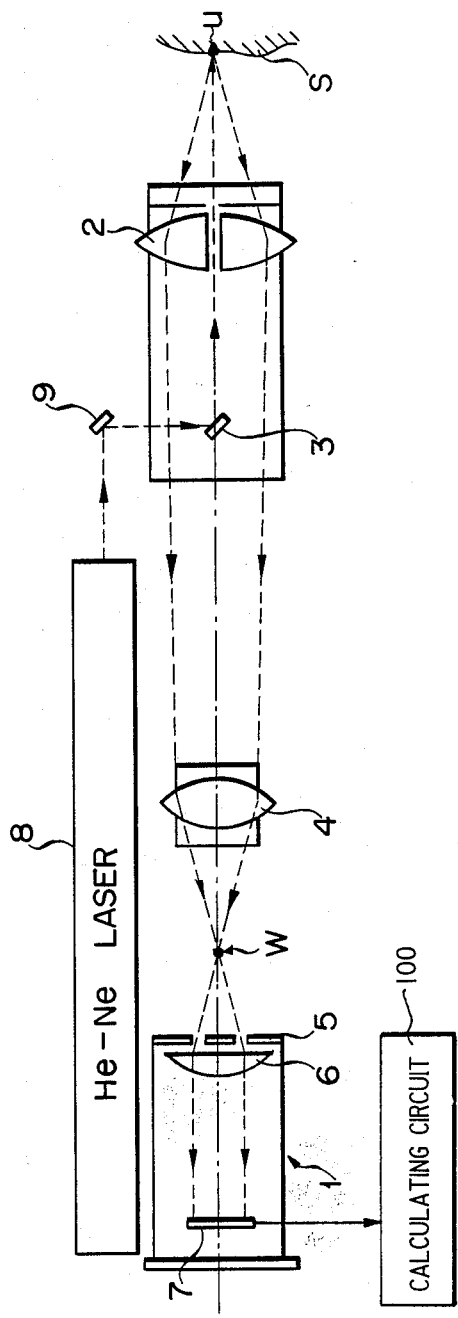
FIG. 1 is a schematic side view of a first embodiment of an optical axis displacement sensor according to this invention.
Figure 2:
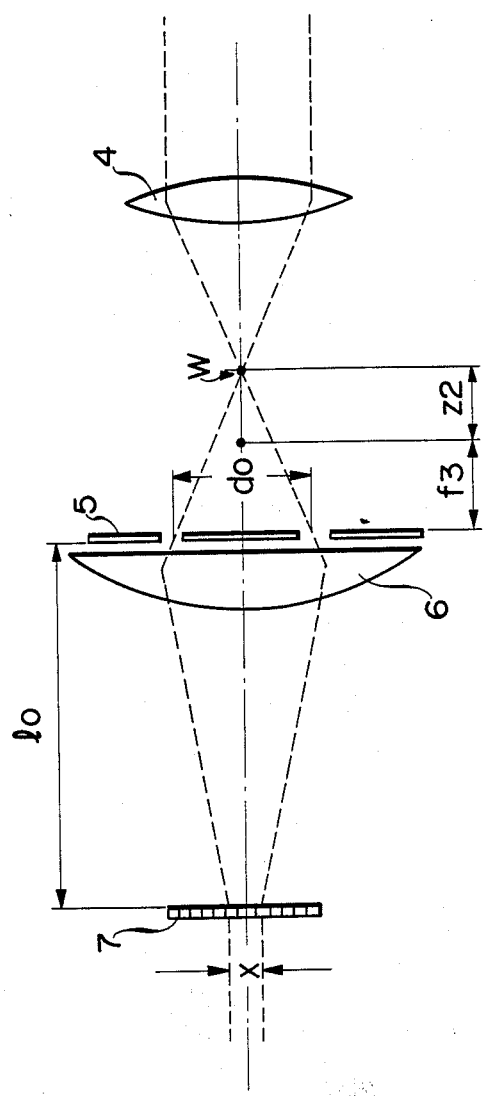
FIG. 2 is a detailed view showing an image point position detector of the first embodiment.
Figure 6:
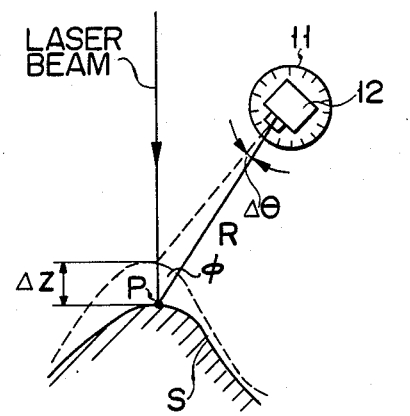
FIG. 6 is a schematic side view of a conventional position measuring apparatus based on a principle of a triangulation.
Figure 7:
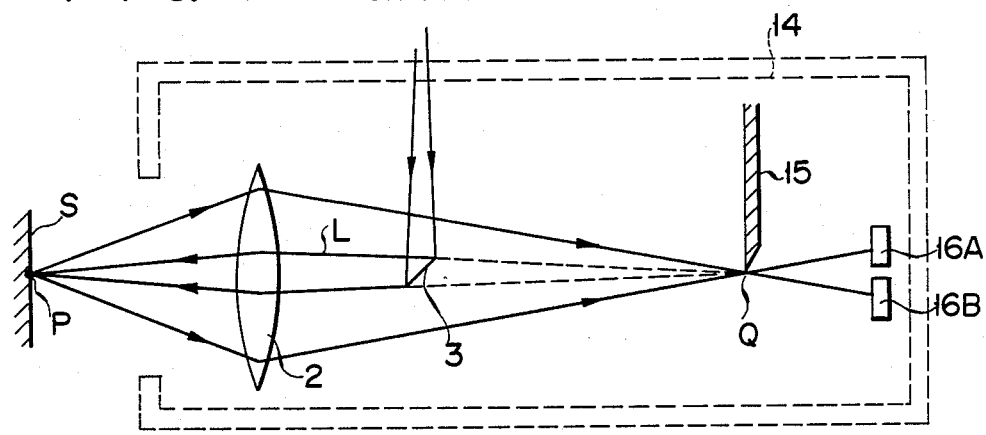
FIG. 7 is a view of a conventional positioning sensor of a compensating method.
Figure 8:
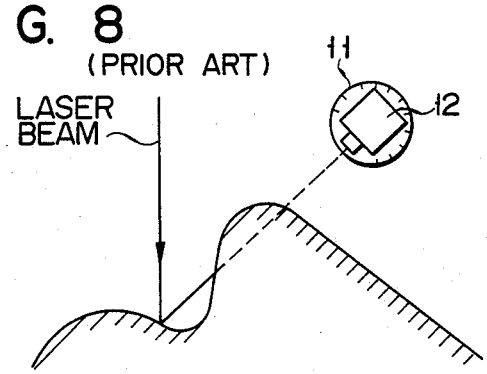
FIG. 8 is a view for describing a shadow effect in the apparatus in FIG. 6.

FIG. 1 shows the construction of a first embodiment. First convex lens 2 having focal length f1 (40 mm) and second convex lens 4 (each lenses 2 and 4 is fixed in a cylinder) having focal length f2 (40 mm) are positioned at distance $d = (f1 + f2)$ of 80 mm and the optical axes thereof coincide with each other. An aperture of about 3 mm in diameter is formed in parallel with the optical axis at the center of lens 2. The output light of an He-Ne gas laser 8 is reflected by mirror 9 toward the optical axis of the lens system composed of first and second lenses 2 and 4. The center of micro mirror 3 is positioned on the optical axes between first and second lenses 2 and 4, the micro mirror 3 reflects a laser beam incident from mirror 9 in parallel with the optical axes so as to irradiate surface S to be measured with the parallel laser beams through the central aperture of lens 2. The distance between lens 2 and surface S to be measured is denoted as $f1 + z1$.

The reflected light of surface S to be measured is focused at an image point W through lenses 2 and 4. The distance between lens 4 and image point W is denoted as $f2 + z2$. Position detector 1 of the image point has a light shielding plate 5, third convex lens 6 having a focal length f3 (30 mm) and a CCD line sensor 7 (having 2592 elements). Lens 6 is positioned so that the optical axis thereof coincides with those of first and second lenses 2 and 4.

Second and third lenses 4 and 6 are so positioned that the focal points thereof coincide with each other. Plate 5 is positioned immediately before lens 6 perpendicularly to the optical axis and has a pin hole or slit at an interval $d_O$ (20 mm) on either side of the optical axis. Sensor 7 is arranged in parallel with plate 5. The output of sensor 7 is inputted to calculating circuit 100 to measure the position of surface S to be measured.

The laser beam reflected on mirror 3 is incident onto surface S through the central aperture of lens 2 and is reflected at point U on the optical axis. The reflected beam is focused at image point W through lenses 2 and 4 and partly passed through the pin holes of plate 5, converged by lens 6, and incident onto sensor 7. When the interval of the incident positions of the beams incident onto sensor 7 through two pin holes of plate 5 is represented by x, the output voltage of sensor 7 has two peaks separate at a distance corresponding to x as shown in FIG. 3. Thus, x can be obtained by attaining the CCD element numbers corresponding to the peaks and the difference therebetween. When x is obtained, since there is the following relationship between x and position z2 of the image point, the position z2 of the image point is obtained by the calculation circuit 100 x, and position z1 of the surface to be measured can be obtained from the equation (5).

$$x = \{(f3^2 + f3z2 - l_O z2) d_O / f3(f3 + z2)\} \quad (6)$$

where $l_O$ is the interval between plate 5 and sensor 7.

According to the embodiment, the lens system is constructed so that the position of surface S to be measured with respect to the focal point of objective lens 2 and the position of image point W with respect to the position of the image point of surface S which is positioned at the focal point are proportional. Therefore, the measuring range and the resolution can be altered by the combination of the lenses of the lens system without necessity of particular correction in the measurement.

The measuring range of the embodiment is 20 mm (−3.5 mm to +16.5 mm with the focal point of first lens 2 as a reference). The resolution is about 10 microns.

According to the embodiment, mirror 3 is arranged between first and second lenses 2 and 4, an aperture is formed (on the optical axis) at the center of first lens 2, and parallel light beams are incident onto surface S to be measured through mirror 3 and the aperture. Therefore, an area irradiated with the laser beam of surface S to be measured becomes constant irrespective of the position of surface S. Thus, the measurement of the position of surface S in a wide range can be performed. Since the beam is emitted on the optical axis of the measuring system and the reflected beam is measured on the optical axis or in the vicinity of the axis, there is no dead angle.

Further, information regarding the image point is obtained from the address of the CCD element of sensor 7 to which the light is incident. More particularly, since the information can be obtained by the CCD element number at which the output voltage becomes maximum, the good reproducibility of the measured result can be obtained without depending upon the intensity of the incident light to the line sensor or the variation in the beam quantity nor the influences of the reflectivity, roughness, curvature and inclination of the surface to be measured, and an external disturbance signal as the conventional apparatus which employs an analog type photoelectric converter (photodetecting diode). The detection of the image point by detector 1 is performed not on the basis of the symmetry of the light beam intensity distribution to the optical axis of the lens as in the conventional technique. Therefore, even if the surface to be measured is not perpendicular to the optical axis and the light beam intensity distribution is resultantly asymmetrical to the optical axis, the measured result is not affected.

Since the measurement is conducted without contact, the apparatus can be also used for the measurement of the displacement of an article such as an elastic body, a soft body or an article in a high temperature vessel.

A second embodiment will be described. The second embodiment is the same as the first embodiment except the construction of position detector 1 of image point W. FIG. 4 is a view showing the construction of position detector 1 according to the second embodiment of the invention, and FIG. 5 shows the output signal of CCD line sensor 7 of FIG. 4.

In the first embodiment, sensor 7 is positioned in a direction perpendicular to the optical axes of first and second lenses 2 and 4. However, in the second embodiment, sensor 7 is positioned on the optical axes of first and second convex lenses 2 and 4. When surface S to be measured is positioned at the focal point of lens 2, the reflected beam is incident onto the center of line sensor 7, as shown by a broken line of FIG. 4. At this time, the output of sensor 7 has a peak value corresponding to the center of sensor 7. When the position of surface S is changed, the trace of the reflected beam is changed as shown by the solid line of FIG. 4 and the output of sensor 7 has a peak value corresponding to the element distanced from the center of sensor 7 by z2. In other words, the image point is shifted by z2 due to the displacement of surface to be measured. Distance z2 can be obtained by detecting the shift of the peak of the output of sensor 7. Z1 is obtained by z2 by equation (5).

According to the invention as described above, the optical system is constructed so that the position of the surface to be measured with the focal point of an objective lens as a reference and the position of the image point corresponding to the reference position of the surface to be measured as a reference are proportional. Therefore, the measuring range and the resolution can be varied by the combination of the lenses of the optical system without necessity of the particular correction in the measurement. Since the CCD line sensor is used as position detecting means, the influence of the reflectivity, roughness, curvature and inclination of the surface to be measured is alleviated. Since the parallel beams are emitted on the optical axis of the optical system and the reflected light is picked up near the optical axis, no dead angle occurs in the measurement. Since the measurement is conducted without contact, the apparatus can be used for the measurement of the displacement of the article such as an elastic body, a soft body or an article in a high temperature vessel which is detrimental in the contact measurement.

This invention is not limited to the particular embodiments described above. Various other changes and modifications may be made within the spirit and scope of the present invention. For example, interval d between first and second lenses 2 and 4 is not always the sum of focal lengths f1 and f2. Further, the position of mirror 3 is not disposed between first and second lenses 2 and 4, but may be arranged between lens 2 and surface S to be measured. In summary, it is sufficient to irradiate surface S with parallel beams. In the embodiments described above, only the apparatus for detecting the displacement of the surface to be measured in the direction of z-axis along the emitted beam has been described. However, when the apparatus is arranged on a table movable in X- and Y-axes directions and displacement Δz of the surface to be measured is obtained in x- and y-axes coordinate values, three-dimensional data of the surface to be measured may be provided.

What is claimed is:

1. An optical axis displacement sensor comprising:
   an optical system having a first convex lens on an optical axis and a second convex lens positioned on the optical axis of the first lens, wherein the two lenses are separated from each other by the sum of the focal distances of both lenses;
   light source means for emitting parallel light beams onto a surface to be measured, and reflective light from the surface is focused at an image point on the optical axis through said optical system, and the position of the image point is in accordance with the distance of the optical system to the surface;
   means for detecting the position of the image point at which an image of the surface is formed by said optical system; and
   calculating means for calculating the position of the surface according to the output of said position detecting means.

2. An optical axis displacement sensor according to claim 1, in which said position detecting means comprises a third convex lens positioned on the optical axis of said optical system, a shielding plate with two pin holes or slits arranged perpendicularly to the optical axis adjacent to the third lens, and a CCD line sensor positioned in parallel with said shielding plate for detecting the interval of incident positions of light beams incident through the third lens and the two pin holes or slits.

3. An optical axis displacement sensor according to claim 1, in which said position detecting means comprises a CCD line sensor positioned on the optical axis of said optical system for detecting the displacement of the image point which is caused when the surface to be measured is displaced from the focal point of the first convex lens.

4. An optical axis displacement sensor according to claim 1, in which said light source means comprises means for generating a laser beam, and reflecting means positioned on the optical axis of said optical system and between the first and the second lenses for reflecting the laser beam so as to irradiate the surface to be measured with the laser beam through a central aperture of the first lens.

5. An optical axis displacement sensor according to claim 1, in which said calculating means obtains the position z1 of the surface to be measured from the following relationship:

$$z1 = z2/(f2/f1)^2$$

wherein f1 and f2 represent the focal lengths of the first and second lenses, f1+f2 represents the distance between the first and second lenses, f1+z1 represents the distance between the surface to be measured and the first lens, and f2+z2 represents the distance between the image point and the second lens.

6. An optical axis displacement sensor, according to claim 1, in which said position detecting means comprises:
   a third lens;
   a plate having two pin holes or two slits; and
   a line sensor which makes a right angle with the optical axis, thereby obtaining the position of the image point from the following relationship:

$$x = \{(f3^2 + f3z2 - l_0z2)d_0\}/f3(f3+z2)$$

where f1, f2 and f3 represent the focal lengths of the first, second and third lenses, f1+f2 represents the distance between the first lens and the second lens, f1+z1 represents the distance between the surface to be measured and the first lens, f2+z2 represents the distance between the image point and the second lens, $d_0$ represents the interval between the pin holes or slits of the plate, $l_0$ represents the distance between the plate and the line sensor, and x represents the interval of the incident positions of the beams to the line sensor.

7. A sensor according to claim 1, in which said position detecting means comprises:
   means for converting a displacement of the image point along the optical axis into a displacement along the direction meeting a right angle with the optical axis.

8. A sensor according to claim 7, in which said converting means comprises:
   a plate having two slits which sandwich the optical axis therebetween at a predetermined space, or two pins holes and a lens for converting two light beams from the image point through two pin holes or two slits of plate into parallel beams.

9. The sensor according to claim 1, in which said first convex lens has an aperture on the optical axis.

* * * * *